United States Patent [19]

Scogin

[11] Patent Number: 5,769,058

[45] Date of Patent: Jun. 23, 1998

[54] COMPRESSOR AND ENGINE SYSTEM

[75] Inventor: Russell L. Scogin, Tomball, Tex.

[73] Assignee: Production Operators, Inc., Houston, Tex.

[21] Appl. No.: 813,576

[22] Filed: Mar. 7, 1997

[51] Int. Cl.$^6$ ..................................................... F01M 9/00
[52] U.S. Cl. .................. 123/527; 123/196 S; 123/196 M
[58] Field of Search ........................... 123/196 S, 196 M, 123/527

[56] References Cited

U.S. PATENT DOCUMENTS

| | | |
|---|---|---|
| 349,983 | 9/1886 | Daimler . |
| 683,152 | 9/1901 | St. John . |
| 1,038,830 | 9/1912 | Bellem et al. . |
| 1,599,878 | 9/1926 | Dickey et al. . |
| 2,256,437 | 9/1941 | Kylen . |
| 2,721,545 | 10/1955 | Harvey ................................ 123/196 M |
| 4,218,328 | 8/1980 | Vaughan ................................ 252/33.2 |
| 4,335,684 | 6/1982 | Davis ........................................ 123/1 A |
| 4,393,823 | 7/1983 | Furukuwa et al. .................. 123/196 M |
| 4,417,561 | 11/1983 | Yasuhara ............................. 123/196 S |
| 4,421,078 | 12/1983 | Hurner ................................ 123/196 S |
| 4,437,813 | 3/1984 | Ingram ...................................... 417/53 |
| 4,459,966 | 7/1984 | Sakano et al. ........................... 123/573 |
| 4,911,120 | 3/1990 | Sumi ....................................... 123/196 |
| 5,002,025 | 3/1991 | Crouse ............................... 123/196 M |
| 5,027,762 | 7/1991 | Tokuyama et al. ................... 123/90.34 |
| 5,041,231 | 8/1991 | Damin et al. ........................... 252/33.2 |
| 5,147,014 | 9/1992 | Pederson ................................... 184/6.3 |
| 5,315,831 | 5/1994 | Goode et al. ............................ 123/527 |
| 5,400,751 | 3/1995 | Grimmer et al. ...................... 123/192.2 |
| 5,501,185 | 3/1996 | King et al. .............................. 123/527 |
| 5,579,735 | 12/1996 | Todero et al. ........................... 123/317 |
| 5,595,964 | 1/1997 | Bardasz .................................. 508/423 |

OTHER PUBLICATIONS

Andrew B. Kromer, Power and Compressor Cylinder Lubrication Systems, Form 9761, Lincoln St. Louis, Mar. 1978, pp. 1–12.

Spec. Sheet, Waukesha Lean Combustion Gas Engine Model 7042 GL 1108 to 1547 BHP.

Operation & Maintenance Manual, Waukesha VHP 6, 12 & 16 Cyl., Second Edition. Nov. 1987, Models F2895 GL, F3521 GL, L5108GL, L5790GL, L7042GL, P9390GL, cover, table of contents, pp. I–VII; Chapters 1,2,3 in full, and pp. 4–23 to 4–26 and 5–1 to 5–16.

Systems, Operations, Testing & Adjusting, Caterpillar G3612 and G3616 Engines, SENR5528–03, Aug. 1995, pp. 1–25, 30–35, 51–56, 60–61, 65 and 94–95.

Waukesha Dresser Service Bulletin, Lubrication System, Waukesha Lube Oil Recommendations, Oct. 15, 1995, pp. 1–10.

*Primary Examiner*—Erick R. Solis
*Attorney, Agent, or Firm*—Pravel, Hewitt, Kimball & Krieger

[57] ABSTRACT

Oil is burned controllably in an engine to reduce valve and valve guide wear and valve seat face recession, thus extending cylinder head and valve life. A nozzle discharges atomized oil into an intake manifold. The nozzle receives the oil from a pressurized source of oil. Used engine lubricating oil from the engine is preferably the source of oil, thus both disposing of used oil and allowing the lubricating oil to be maintained fresher. An atomizing fluid, such as air or natural gas, is fed to the nozzle for atomizing the oil. An air and fuel mixture conveys the atomized oil into combustion chambers where the oil is burned. The oil has an additive that leaves a finely dispersed ash residue in the combustion chambers when the oil is burned. Where a valve closes against a seat face in the cylinder head, the ash residue reduces valve wear and seat face recession, presumably because the ash residue provides a cushioning effect. Run time between overhauls for repair or replacement of cylinder heads and/or valves is extended.

20 Claims, 3 Drawing Sheets

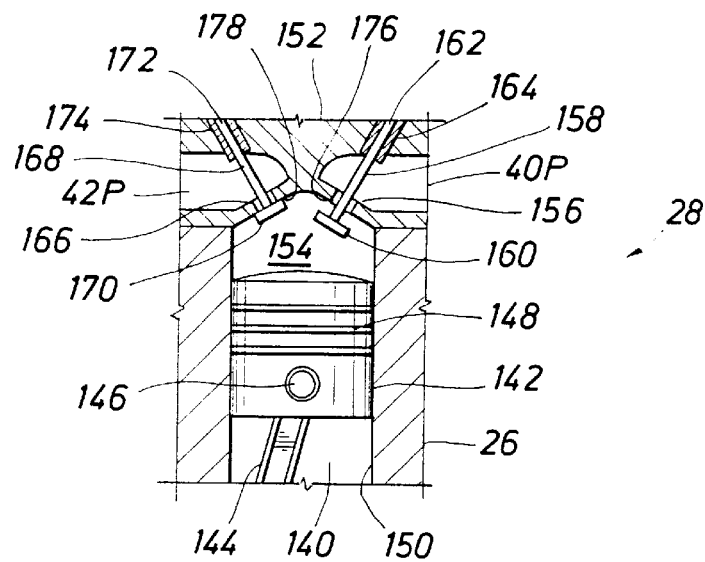
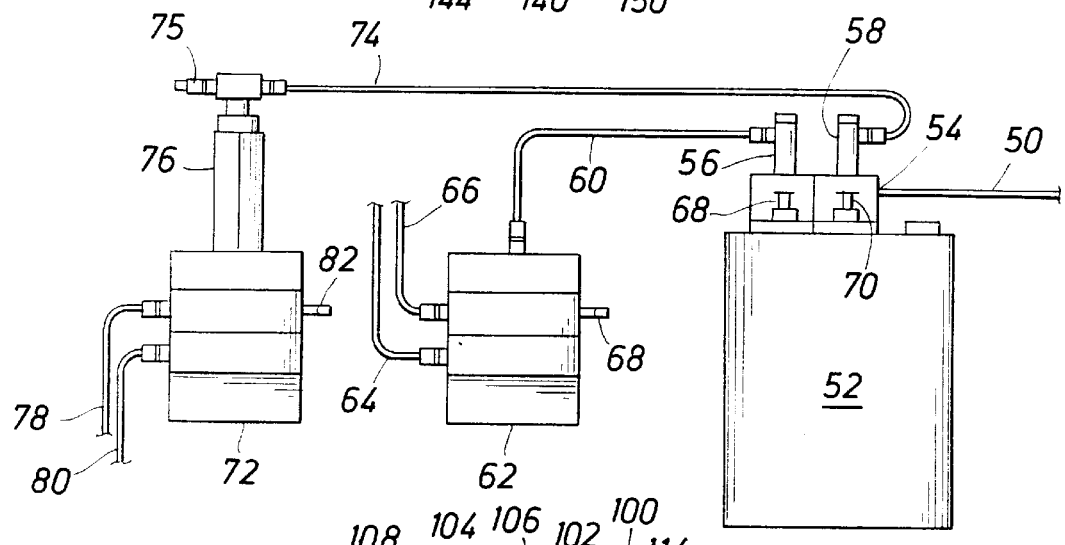
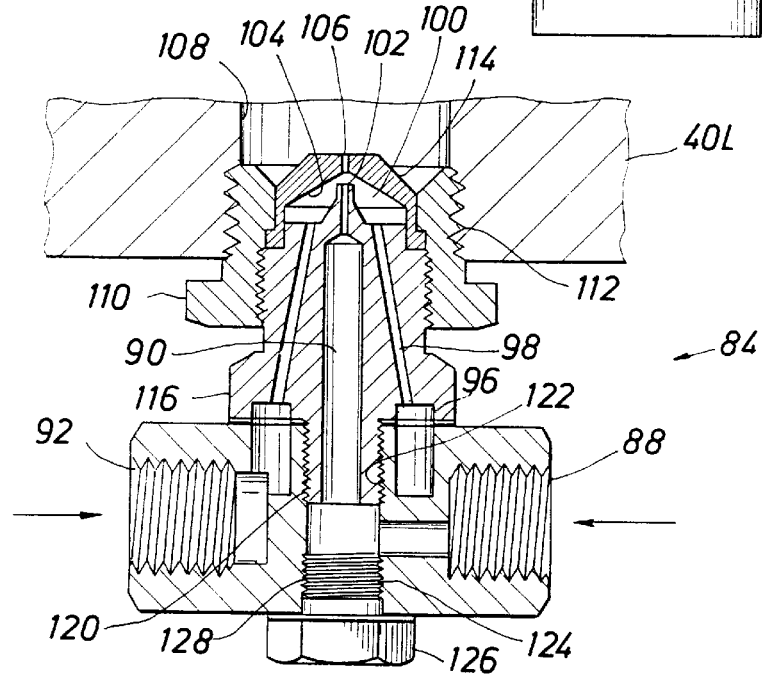

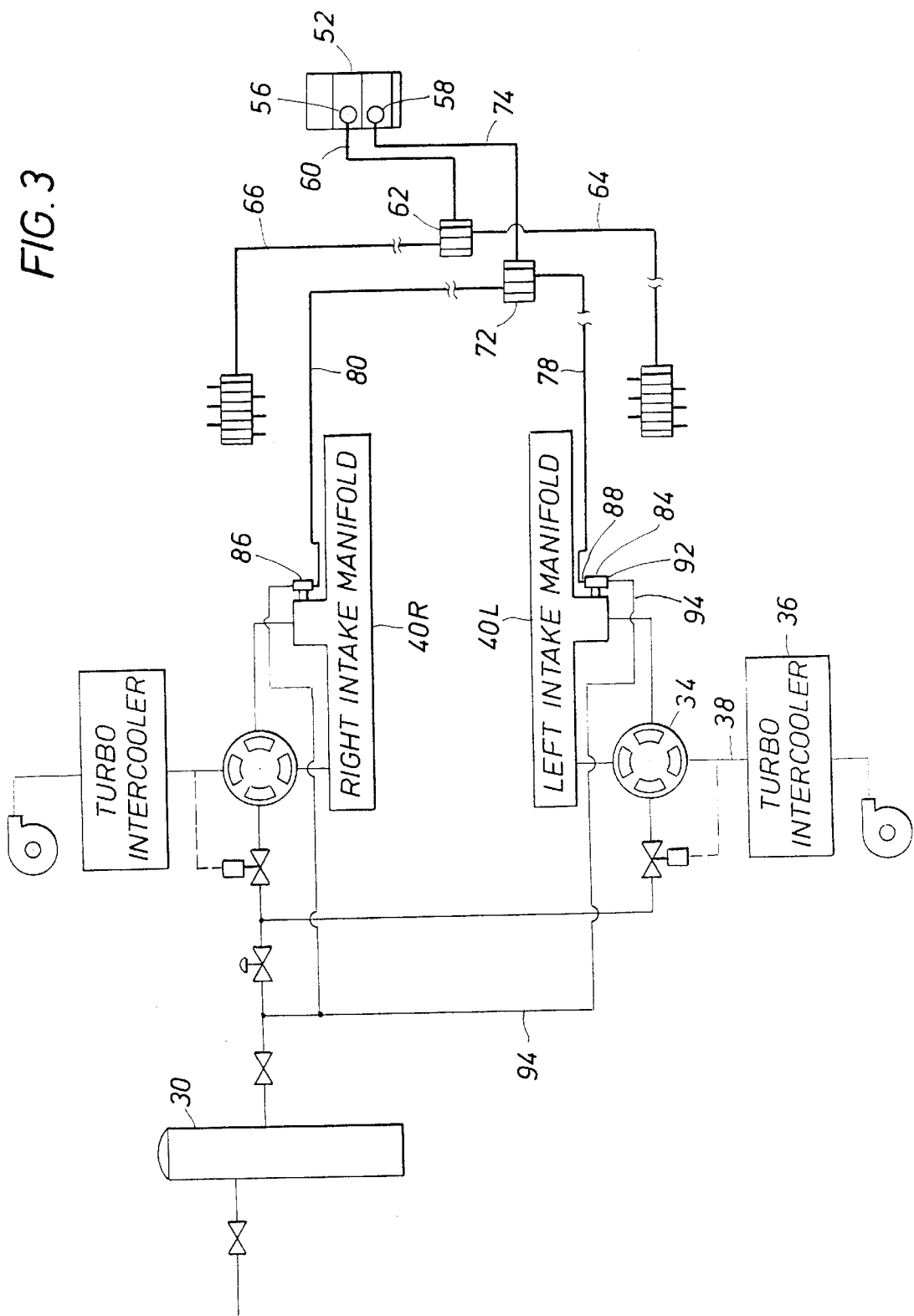

COMPRESSOR AND ENGINE SYSTEM

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to internal combustion engines, and more particularly to the burning of oil in the engine.

2. Description of the Related Art

Industrial natural gas-fired engines can operate essentially continuously for several years between major overhauls. For example, the Waukesha Engine Division of Dresser Industries, Inc. in Waukesha, Wisconsin, referred to hereinafter as "Waukesha," manufactures a lean combustion gas engine known as a model 7042 GL which is a V-12 engine. The model 7042 GL engine operated as long as about three to three and one half years between major overhauls. At that time the limiting factor for run time was cylinder wear.

In recent years, Waukesha improved cylinder wear resistance by incorporating an induction hardened liner in the cylinders of these natural gas-fired engines. Overhaul intervals increased to about four to four and one half years. Shortly after the introduction of the hardened cylinder wall liner, Waukesha changed its pistons for these engines from a four-ring piston to a three-ring piston. With the introduction of the three-ring piston, oil consumption in these engines dropped dramatically. The engines with four-ring pistons had previously initially burned about three gallons of oil per day, which increased over time to about six gallons per day. The engines with three-ring pistons on the other hand initially burned only about one-half gallon of oil per day.

After the introduction of the three-ring pistons, engine head life was shortened to about one year. Prior to this the heads lasted the entire overhaul cycle. These engines began experiencing an unusually high number of cylinder head failures due to excessive valve and valve guide wear and valve seat face recession in the cylinder heads. In a fleet of about two hundred of these engines, there were about twelve head failures in 1995 with the four-ring pistons. As this fleet of engines was gradually converted to three-ring pistons, cylinder head failures increased to about two hundred ninety eight (298) in 1996, although only a portion of the engines were using three-ring pistons.

Possibly, but not necessarily, in response to the dramatic increase in head failures, Waukesha sent out a service bulletin to identify the lube oil needs of its engines. In Service Bulletin Identification No. 12-1880T dated Oct. 15, 1995, Waukesha recommended that if an engine owner were experiencing valve recession greater than 0.002 in. (0.05 mm) per thousand hours of operation, then a switch to a gas engine oil having a higher ash additive content should be considered. Waukesha stated that ash forming constituents in oil formulations provided detergency, corrosion protection and anti-wear protection. In addition, Waukesha stated that the ash produced during combustion of these additives provided protection against valve face and valve seat recession.

In addition to the Bulletin, Waukesha attempted to solve the problem of excessive valve and valve guide wear and seat face recession in several ways. Different valves and valve guides were substituted, but this did not solve the problem. A different oil seal system around the valve stem was introduced, but still the problem of excessive valve seat recession and wear in the valve stem and guide persisted. Finally, piston rings of a new design were introduced which presumably allowed greater oil leakage from the crankcase, through the piston ring-cylinder wall seal, and into the combustion chamber because oil consumption increased dramatically with this change. With the initial three-ring piston, oil consumption was typically about one-half gallon per day per engine, while after the piston ring design change, the oil consumption was about three gallons per day. Although data is not yet available, this may have solved the problem of excessive valve seat recession and wear in the valve stem and guide. However, it is believed that over time oil consumption will become excessive, possibly approaching the six gallons per day that was experienced previously. Thus, a need remains for a solution to extend run time between engine head replacement, while controllably minimizing oil consumption.

SUMMARY OF THE INVENTION

The present invention provides an improved compressor and internal combustion engine system. A compressor is provided for compressing natural gas, and an engine drives the compressor. Major components of the engine include an engine block having a plurality of cylinder bores, a piston disposed in each cylinder bore, and a cylinder head mounted on the block, a combustion chamber being defined within each cylinder bore by a piston on a lower side and the cylinder head on an upper side. Each cylinder head has intake ports for introducing a fuel and air mixture into each combustion chamber and exhaust ports for exhausting combustion gases from the combustion chamber. Valves having stems with a valve head on one end are operatively engaged in the intake and exhaust ports for regulating flow, the valve head of each valve being located in the combustion chamber. The cylinder heads have a seat face for each valve head, the valve head and the seat face forming a metal-to-metal seal for sealing the intake and exhaust ports. A nozzle discharges atomized oil into an air and fuel mixture, the mixture conveying the atomized oil into each combustion chamber, where the mixture and the atomized oil are burned. The nozzle receives oil and an atomizing fluid in an inlet, and the oil contains an additive which deposits an ash residue in each combustion chamber. The ash residue reduces recession in the seat face and wear in the valves.

Preferably, the oil is lubricating oil for the engine, thus providing both a method for extending engine run time between overhauls and a method for disposing of used oil. Oil from the engine, preferably under pressure, is withdrawn and conveyed to the inlet of the nozzle through a line. If the engine uses natural gas for fuel, then natural gas may be used as the atomizing fluid; otherwise, air is preferably used.

In another aspect the present invention provides an apparatus for an internal combustion engine for extending run time between repairs. An injector having an inlet and an outlet is attached to the engine so that the outlet is in fluid communication with combustion chamber in the engine. A first fluid is conveyed to the inlet under pressure, the pressure being greater than the pressure in the combustion chamber. The first fluid includes an ash additive for depositing an ash residue in the combustion chamber when burned.

This summary is intended to generally highlight features of the invention. The detailed description of the embodiments of the invention follows, with the claims setting out the scope of patent coverage to be obtained.

BRIEF DESCRIPTION OF THE DRAWINGS

A better understanding of the present invention can be obtained when the following detailed description of various embodiments of the invention is considered in conjunction with the drawings, which are described as follows.

FIG. 2 is a schematic diagram of a lube oil pump and divider blocks.

FIG. 3 is a schematic diagram of an oil and natural gas system for atomizing and discharging oil from a nozzle into an intake manifold as a mist, according to the present invention.

FIG. 4 is a cross section of a nozzle for mixing oil and atomizing fluid and discharging oil mist into an intake manifold.

FIG. 5 is a cross section of an elevation for a typical cylinder.

DETAILED DESCRIPTION OF THE PREFERRED EMBODIMENTS

Figure 1:
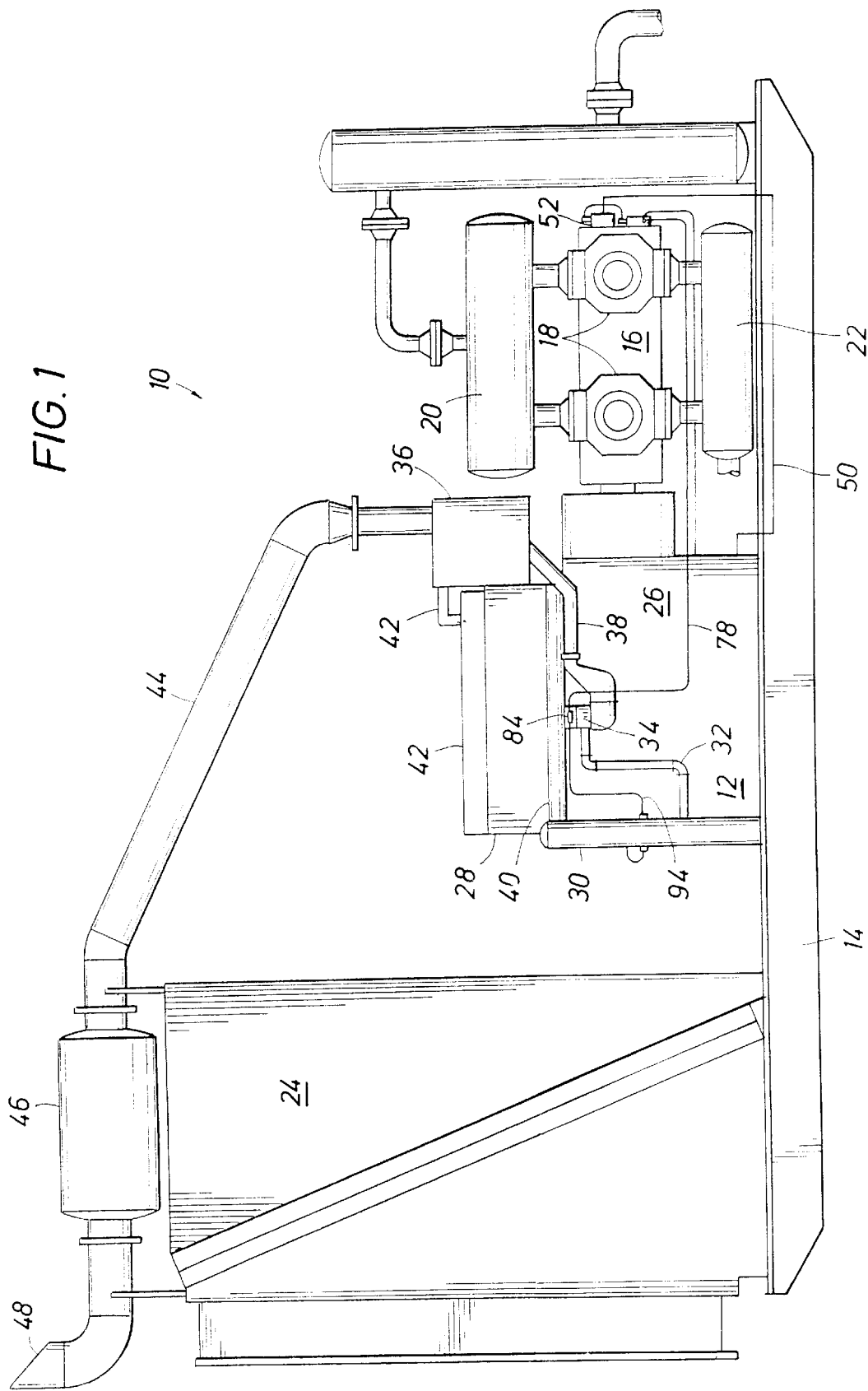
FIG. 1 is a schematic elevation of an engine and compression system according to the present invention.

With reference to FIG. 1, an engine and compression system 10 according to the present invention is shown in schematic elevation. An internal combustion engine 12 is mounted on a skid 14 and coupled to a compressor 16. Engine 12 is, for example, a Waukesha model 7042 GL, which is a twelve cylinder engine configured as a V 12. System 10 is used for compressing natural gas from a gas field for delivery into a pipeline. Compressor 16 is a positive displacement compressor having compressor cylinders 18, a suction bottle 20 and a discharge bottle 22. An air-cooled heat exchanger 24 provides cooling for compressed gas from compressor 18.

Engine 12 has an engine block 26 with cylinders 28. The fuel for this engine is the same natural gas as is compressed in compressor 16. Fuel is supplied under pressure control to a fuel filter 30. Natural gas is conveyed from fuel gas filter 30 through a line 32 to a carburetor 34. Air is drawn in from the atmosphere through a turbocharger 36 and conveyed through a line 38 to carburetor 34, providing, on a volume basis, an air-to-fuel ratio of about 28 to 1. For a 1,000 HP engine, fuel is consumed at a rate of about 170,000 cubic feet per day. There is 28 times that much air added, typically. Thus, a great volume of gas and air flows through carburetor 34. Carburetor 34 discharges into an intake manifold 40. Intake manifold 40 provides an even distribution of an air and fuel mixture to each of the cylinders 28. The fuel is burned in combustion chambers located in the cylinder heads and exhaust gases are discharged into an exhaust manifold 42. Exhaust gases are discharged through turbocharger 36, and an exhaust pipe 44 conveys the exhaust gases to a muffler 46 for discharge into the air through a tailpipe 48.

Although not fully shown, the model 7042 GL engine has a full pressure lubrication system with a high capacity gear-type pump and a base-type oil pan. Lubricating oil from engine 12 is withdrawn through a line 50 and conveyed to a lube pump 52. With reference to FIG. 2, lube pump 52 has an inlet 54 for receiving engine lubricating oil through line 50. Lube pump 52 has two discharge outlets 56 and 58. Discharge outlet 56 is connected by a line 60 to a divider block 62. Lines 64 and 66 convey lubricating oil to compressor 16, one line for each side of compressor 16. Lube pump 52 is an existing pump for compressor lubrication, and it has dual inlets and outlets. By consolidating the compression lubrication supply and using discharge outlet 56 with divider block 62 for the compressor, discharge outlet 58 is made available for use as described below. Divider block 62 provides a flow measurement, and a cycle indicator pin 68 provides an indicator for the flow rate. Divider block 62 divides the flow from line 60 equally for discharge in lines 64 and 66. This is done positively and progressively by means of a number of multiple lobe pistons and a series of drill ports in divider block 62. Lube pump 52 has adjustment screws 68 and 70 for adjusting the stroke of the positive displacement pumps discharging through outlets 56 and 58. By adjusting adjustment screws 68, 70 and timing the movement of cycle indicator pin 68, a desired flow rate can be discharged through lines 64 and 66.

A divider block 72 is connected to discharge outlet 58 by a line 74, and a rupture disk 75 having a burst strength of about 800 psig is provided. A filter 76 is disposed between divider block 72 and discharge outlet 58 for removing particulate matter from the lubricating oil. Divider block 72 divides the flow in line 74 equally for discharge into lines 78 and 80. A cycle indicator pin 82 provides a visual indication of flow rate through divider block 72. By adjusting adjustment screw 70 on lube pump 52 the flow through line 74 can be manipulated, and by noting the cycle time of cycle indicator pin 82, the flow can be measured.

With reference now to FIG. 3, a nozzle 84 is tapped into a left intake manifold 40L and a nozzle 86 is tapped into a right intake manifold 40R, where the suffixes indicate left and right, respectively. A cross section of nozzle 84 is provided in FIG. 4. Nozzle 84 has an oil inlet 88 which receives line 78. Nozzle 84 has a central bore 90 connected to oil inlet 88. Nozzle 84 has a gas inlet 92, and a line 94 conveys natural gas from fuel gas filter 30 to gas inlet 92.

The pressure in fuel gas filter 30 is regulated, and the pressure in line 94 is typically 25 to 30 psig. The pressure in intake manifold 40 is about 10 to 13 psig, and the pressure in line 94 should be at least about 10 psi higher than the pressure in intake manifold 40. The natural gas in line 94 serves as an atomizing fluid for the oil conveyed to nozzle 84 by line 78. Within nozzle 84, natural gas from line 94 is received through gas inlet 92 into an annular chamber 96. Passages 98 convey the gas from annular chamber 96 to a mixing chamber 100. Central bore 90 discharges oil through an opening 102 into mixing chamber 100. Opening 102 has a smaller diameter than central bore 90 so that oil is discharged from central bore 90 at a high velocity. Passages 98 discharge natural gas into mixing chamber 100 also at a high velocity. Mixing chamber 100 has inside walls 104 shaped to intimately mix the natural gas with the oil, so as to atomize the oil. Natural gas and atomized oil droplets, an oil mist, are discharged from nozzle 84 through an orifice 106. The atomized oil or oil mist is discharged into intake manifold 40, wherein intake manifold 40 represents either left intake manifold 40L or right intake manifold 40R. Likewise, nozzle 86 is identical to nozzle 84 and operates in an identical manner.

Intake manifold 40 has a threaded hole 108 for receiving the oil mist discharged from orifice 106. A mounting adapter 110 has external threads 112 for securing nozzle 84 to intake manifold 40. Mounting adapter 110 secures an air cap 114 to a nozzle body 116. An inlet tee 118 having oil inlet 88 and gas inlet 92 is connected to nozzle body 116, body 116 having male threads 120 and inlet tee 118 having female threads 122. Inlet tee 118 has a threaded opening 124 coaxial with central bore 90, and a plug 126 having male threads 128 provides a closure for threaded opening 124. Spray Systems Company of Wheaton, Ill. manufactures an atomizing nozzle suitable for use as nozzle 84 or 86. A Spray Systems Company nozzle designated as ¼-JSS less CP-1158-SS with CP-3376-SS thick wall mounting adapter with PF-1050-SS 0.010 orifice and PA 67147-SS assembled. Mounting adapter 110 is component CP-3376-SS which replaces a knurled retainer ring identified as CP-1158-SS. Orifice 106 has a diameter of 0.010 inches.

With reference to FIG. 5, a cross section of an elevation of a typical cylinder 28 is illustrated. Cylinder 28 has a cylindrical bore 140 which receives a piston 142 which is pivotally connected to a piston rod 144 by a pin 146. Rings 148 provide a seal between piston 142 and an inside wall 150 defining bore 140. Bore 140 is formed in engine block 26. A cylinder head 152 is bolted to engine block 26. Cylinder head 152 has a passageway 40P in fluid communication with intake manifold 40. Cylinder head 152, wall 150 and piston 142 define a combustion chamber 154 in bore 140. An intake port 156 provides a passageway for receipt of an air and fuel mixture into combustion chamber 154. A valve 158 has a valve head 160 and a valve stem 162 for closing intake port 156 so as to regulate flow into combustion chamber 154. A valve guide 164 provides a guide for valve stem 162.

Cylinder 28 has an exhaust passageway 42P which is in fluid communication with exhaust manifold 42. An exhaust port 166 provides an opening between combustion chamber 154 and exhaust passageway 42P. An exhaust valve 168 has a valve head 170 and a valve stem 172 for closing exhaust port 166. A guide 174 guides valve stem 172. Cylinder head 152 has a seat face 176 for receiving and sealing with valve head 160, seat face 176 being located about the perimeter of intake port 156. Cylinder head 152 has a seat face 178 about the perimeter of exhaust port 166 for receiving and sealing with valve head 170 of exhaust valve 168.

The problem solved by the present invention is wear on the valves 158 and 168 and the guides 164 and 174 and recession in seat faces 176 and 178. The present invention operates as follows. Natural gas from line 32 and air from line 38 are mixed in carburetor 34 and discharged into intake manifold 40 (FIG. 1). Engine lubricating oil is withdrawn from block 26 via line 50, pressurized in lube pump 52, and fed via line 78 to nozzle 84. Natural gas from fuel gas filter 30 is conveyed by line 94 to nozzle 84 for atomizing the oil and forming an oil mist which is discharged into intake manifold 40. The oil mist is conveyed by the mixture of natural gas and air through intake manifold 40 into intake passageway 40P through intake port 156 into combustion chamber 154 (FIG. 5). Valve 158 closes and a spark plug (not shown) provides a spark to ignite the combustible mixture of natural gas, air and oil mist. The combustible mixture burns with explosive force, pushing piston 142 downward, and is then exhausted through exhaust port 166 after exhaust valve 168 opens. Exhaust gases flow out through exhaust passageway 42P into exhaust manifold 42 for discharge through exhaust pipe 44, muffler 46 and tailpipe 48.

Combustion of the oil mist causes a deposit of an ash residue to be formed inside combustion chamber 154. The ash residue coats seat faces 176 and 178 as well as valve heads 160 and 170. This ash residue reduces valve and valve guide wear and seat face recession. Presumably, the ash residue provides a cushioning effect as valve heads 160 and 170 close against seat faces 176 and 178, respectively. Prior to this invention, seat faces 176 and 178 have been observed to wear less when there is a deposit of ash on and around seat faces 176 and 178 and valve heads 160 and 170. It was observed prior to this invention that when seat faces 176 and 178 do not wear, then guides 164 and 174, as well as valve stems 162 and 172, do not wear nearly as rapidly as when there is no ash deposit or ash residue on the surfaces defining an upper portion of combustion chamber 154.

It was observed prior to this invention that when an engine was taken apart to be overhauled, where there was an ash residue in the cylinder head, the cylinder head and its components were relatively unworn as compared to cylinder heads where no ash deposit or residue was found. In engines of the prior art, the sources of this residue was oil burned in the combustion chamber where the oil had leaked into the combustion chamber through the seal between the piston and the cylinder wall. However, this was an uncontrolled addition of oil to the combustion chambers, and within a single engine some of the cylinder heads were found to not have an ash deposit while other cylinder heads from the same engine did have a deposit of ash residue. Those cylinder heads that did not have the ash residue were found to be worn and in need of replacement, while those cylinder heads found to have an ash residue were found to be in good condition and did not need to be replaced. This was the genesis of the idea to controllably add oil into the combustion chambers.

A commercially-available solution for controllably adding oil to the combustion chambers was sought, but none was found. An experiment was conducted where oil was added into the natural gas that was fed as fuel to the engine. However, the oil tended to settle out in the lines and thus was not conveyed properly into the combustion chambers. The idea to atomize the oil in a nozzle and discharge the atomized oil into the intake manifold was subsequently developed.

Since an objective of the invention is to provide an ash deposit in the combustion chamber, it is critical that the oil that is injected into the combustion chamber contain an additive that, when burned, leaves an ash residue. Lubricating oils are specially formulated for gas engines and are usually highly refined mineral oil base stocks. Since very little oil is injected into the intake manifold and the lubricating oil uses a highly refined mineral oil base stock, the residue that would be provided by the base stock itself would be minimal. Consequently, the oil should be formulated to provide sufficient ash residue in the combustion chambers when burned.

The engine oil recommended by Waukesha for its model 7042 GL gas engine has been found to provide sufficient ash residue. Waukesha recommends in its service bulletin No. 12-1880T a minimum of 0.35% sulfated ash by weight with both metallic and ashless additive systems. Waukesha also recommends that a maximum of 0.10% zinc be added to the base stock. Additional experimentation may result in a more optimum choice of lubricating oil for providing an ash residue in the combustion chamber, but it appears that a lubricating oil having an ash additive ranging from about 0.1 to about 1 weight percent is satisfactory for providing an ash residue in the combustion chamber. Several manufacturers of lubricating oil provide oil having a sulfated ash content. For example, Exxon Company USA provides a lubricating oil under the brand name Estor Select 40 which has a sulfated ash content of 0.95 weight percent and Mobil Oil Company provides a lubricating oil under the brand name Mobil Pegasus 485 having a sulfated ash content of 0.38 weight percent.

For Waukesha's model 7042 GL, a V-12 engine, about 12 pints of oil per day is conveyed through line 78 into nozzle 84 for injection into left intake manifold 40L, and about 12 pints of oil per day is conveyed through the line 80 into nozzle 86 for injection into right intake manifold 40R. Consequently, line 74 conveys about 24 pints per day, and at this rate cycle indicator pin 82 operates at about 10 seconds per cycle.

A separate lube oil pump is not necessary for providing oil to nozzle 84. Alternatively, engine lubricating oil can be withdrawn from a pressurized point associated with block 26. A lubrication system pump for an industrial grade engine can have a discharge pressure of about 55 to 60 psig, which is more than adequate for discharge through nozzle 84 into intake manifold 40. Also, it is not necessary to use the engine lubricating oil from the engine itself, although this provides a convenient method for disposing of the used oil while providing a method for maintaining the engine lubricating oil in a relatively fresh condition by adding make-up oil. Alternatively, an independent source of oil can be provided to the atomizing nozzle for injection into the intake manifold. In addition, air, rather than natural gas, can be used as the atomizing fluid.

A natural gas-fired engine has been described here, but other types of engines can benefit from the present invention as well. For example, engines that use diesel fuel and gasoline can also be provided with a controlled addition of an oil into the combustion chambers. The injection point has been described here as just downstream of the carburetor, which is considered beneficial because the fuel and air mixture is a good carrier for transporting the oil into the combustion chambers. However, any injection system that allows an ash component to enter the combustion chambers is satisfactory. For example, an injector can be used to inject a material directly into the combustion chambers, where the material deposits an ash residue when burned. The material may be a carrier fluid for conveying an ash additive or the material may itself deposit a suitable residue when burned in the combustion chamber.

The present invention is different from conventional lubrication systems. At the combustion temperature in the combustion chambers, conventional lubrication cannot work because the oil would vaporize and burn. The present invention instead uses lubricating oil as a vehicle for delivering an ash additive to the combustion chambers. The ash additive burns in the combustion chambers and deposits an ash residue on an inside surface of the cylinder head, coating the valve heads and seat faces. It is this coating of ash residue that is desirable for inhibiting valve wear and seat face recession. Without being bound by theory, it is believed that the ash residue provides a cushioning effect as the metal valve heads 160 and 170 repeatedly pound against the metal seat faces 176 and 178, respectively.

Since lubricating oil is merely used as a vehicle for delivering an ash additive into the combustion chambers, rather than being used for lubrication per se, it may be possible to use another vehicle for delivering the ash additive. Possibly, a suitable additive can be added to the fuel burned in the engine, which for the embodiment described above, would be to the natural gas. Alternatively, an additive can possibly be injected into the air fed to the combustion chambers. For a natural gas-fired engine as described herein, it is believed best to inject oil as described. This is particularly true given the ancillary benefits concerning waste oil disposal and maintenance of fresh engine lubricating oil.

The present invention provides a method for delivering and burning controllably oil in a combustion chamber to reduce valve wear and seat face recession. Where there is leakage in the seal between piston rings 148 and cylinder wall 150, there is an uncontrolled leakage of oil into the combustion chamber. Such leakage varies from cylinder to cylinder, and the leakage varies with time as the piston rings and/or cylinder wall wear. In contrast the present invention burns oil in the combustion chambers at a known and controllable rate. Since the oil mist is discharged into the air and fuel mixture, it is distributed evenly between the cylinders as the air and fuel mixture is burned essentially evenly between the cylinders. Further, as an engine wears and oil consumption increases, the rate of oil injection through nozzles 84 and 86 can be decreased to compensate for the increased oil consumption, which is leakage between the piston rings and cylinder walls into the combustion chambers.

The foregoing disclosure and description of the invention are illustrative and explanatory thereof, and various modifications and alterations to the embodiments disclosed herein will be apparent to those skilled in the art in view of this disclosure. It is intended that all such variations and modifications fall within the spirit and scope of this invention as claimed.

What is claimed is:

1. A compressor and engine system, comprising:
   a compressor for compressing natural gas;
   an internal combustion engine operatively connected to the compressor, the internal combustion engine including:
   an engine block having a plurality of cylinder bores;
   a piston operatively engaged in each cylinder bore;
   a cylinder head connected to the block, wherein a combustion chamber is defined in each cylinder bore by the piston and the cylinder head, the cylinder head having an intake port and an exhaust port for each combustion chamber;
   an intake valve operatively engaged in each intake port;
   an exhaust valve operatively engaged in each exhaust port;
   an intake manifold having a passageway for delivering an air and fuel mixture to each combustion chamber through the intake port;
   a nozzle connected to the manifold, the nozzle having a nozzle inlet and a nozzle outlet, wherein the nozzle outlet discharges into the manifold;
   a first line conveying a source of oil to the nozzle inlet, the oil having an additive that deposits an ash residue when the oil is burned; and
   a second line conveying an atomizing fluid to the nozzle inlet, wherein the atomizing fluid atomizes the oil so that an oil mist is discharged into the manifold, the oil mist being burned in the combustion chamber for extending run time between repairs, the ash residue being found deposited on an inner surface of the cylinder head when the engine is taken out of service and inspected.

2. The internal combustion engine of claim 1, wherein the source of oil is a pressurized source of engine lubrication oil.

3. The internal combustion engine of claim 1, wherein the engine is a natural gas-fired engine, and the atomizing fluid is natural gas.

4. The internal combustion engine of claim 1, further comprising a pressure regulator in the first line for regulating oil flow by pressure control.

5. The internal combustion engine of claim 1, further comprising a filter in the first line for removing particulate matter from the oil.

6. The internal combustion engine of claim 1, further comprising:

a lube oil pump having a suction side and a discharge side, the suction side being in fluid communication with lubricating oil for the engine; and a divider block for measuring flow rate, the divider block having a divider inlet and a divider outlet, the divider inlet being in fluid communication with the discharge side of the pump, wherein the first line conveys oil from the divider outlet to the nozzle inlet.

7. The internal combustion engine of claim 6, wherein the engine has left and right banks of combustion chambers and an intake manifold and nozzle for each bank, wherein the divider block has a left divider outlet and a right divider outlet for providing a measured flow to each bank of combustion chambers.

8. The internal combustion engine of claim 6, wherein the engine is operatively coupled to a compressor for driving the compressor, wherein the compressor has a compressor lubrication system, and wherein the discharge side of the lube oil pump is in fluid communication with the compressor lubrication system.

9. The internal combustion engine of claim 6, wherein the lube oil pump is a positive displacement pump.

10. An apparatus for an internal combustion engine having a combustion chamber, comprising:

an injector having an inlet and an outlet, wherein the outlet is in fluid communication with the combustion chamber; and a first fluid in fluid communication with the inlet, the first fluid being at a pressure greater than the pressure in the combustion chamber, wherein the first fluid comprises an ash additive for depositing an ash residue in the combustion chamber when burned for extending run time between repairs of the engine, internal surfaces of the combustion chamber being relatively dry and having a deposit of ash residue when the engine is shut down and inspected after being operated.

11. The apparatus of claim 10, further comprising a source of a second fluid in fluid communication with the inlet for atomizing the first fluid.

12. The apparatus of claim 10, wherein the first fluid is an oil.

13. The apparatus of claim 11, wherein the second fluid is a combustible fluid.

14. The apparatus of claim 11, wherein the second fluid is air.

15. A method for an internal combustion engine for having a cylinder head, comprising:

withdrawing oil from the engine, the oil having an additive that deposits an ash residue when the oil is burned;

atomizing the oil with a fluid in a nozzle;

discharging the atomized oil from the nozzle;

feeding the atomized oil into a combustion chamber in the engine;

burning the atomized oil in the combustion chamber; and depositing an ash residue on inner surfaces of the combustion chamber so that run time of the engine between repairs of the cylinder head is extended.

16. The apparatus of claim 15, wherein the fluid is natural gas.

17. The apparatus of claim 15, wherein the fluid is air.

18. A compressor and engine system, comprising:

a compressor for compressing natural gas;

a natural gas-fired internal combustion engine operatively connected to the compressor, the internal combustion engine including:

an engine block having a plurality of cylinder bores;

a piston operatively engaged in each cylinder bore;

a cylinder head connected to the block, wherein a combustion chamber is defined in each cylinder bore by the piston and the cylinder head, the cylinder head having an intake port and an exhaust port for each combustion chamber;

an intake valve operatively engaged in each intake port;

an exhaust valve operatively engaged in each exhaust port;

an intake manifold having a passageway for delivering an air and natural gas mixture to each combustion chamber through the intake port;

a nozzle connected to the manifold, the nozzle having a nozzle inlet and a nozzle outlet, wherein the nozzle outlet discharges into the manifold;

a first line conveying oil from the engine to the nozzle inlet, the oil having an additive that deposits an ash residue when the oil is burned; and a second line conveying natural gas to the nozzle inlet, wherein the natural gas atomizes the oil so that an oil mist is discharged into the manifold, the oil mist being burned in each combustion chamber, the ash residue being deposited on the cylinder head for reducing wear on the intake and exhaust valves.

19. The compressor and engine system of claim 18, further comprising:

a lube oil pump having a suction side and a discharge side, the suction side being in fluid communication with the oil from the engine; and a divider block for measuring flow rate, the divider block having a divider inlet and a divider outlet, the divider inlet being in fluid communication with the discharge side of the pump, wherein the first line conveys oil from the divider outlet to the nozzle inlet; and an adjustment device for manipulating the flow rate of oil conveyed by the first line for burning oil at a controlled rate.

20. The apparatus of claim 18, further comprising a skid on which the engine and compressor are mounted.

* * * * *